Figure 1:
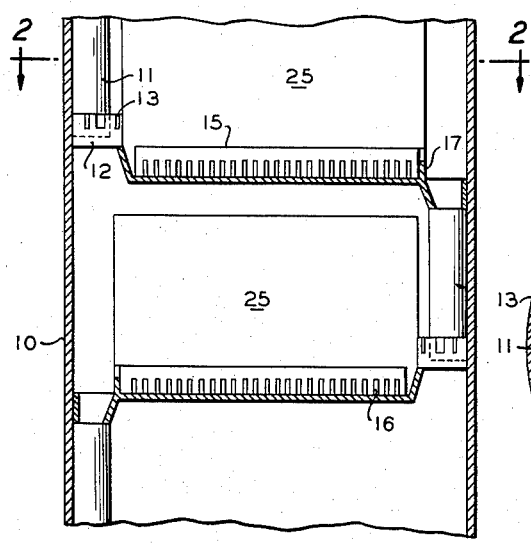

Dec. 20, 1960 K. H. HACHMUTH 2,965,548
FRACTIONATION METHOD AND APPARATUS FOR CONDUCTING SAME
Filed Aug. 11, 1955 2 Sheets-Sheet 1

INVENTOR.
K. H. HACHMUTH
BY
Hudson & Young
ATTORNEYS

Dec. 20, 1960   K. H. HACHMUTH   2,965,548
FRACTIONATION METHOD AND APPARATUS FOR CONDUCTING SAME
Filed Aug. 11, 1955   2 Sheets-Sheet 2
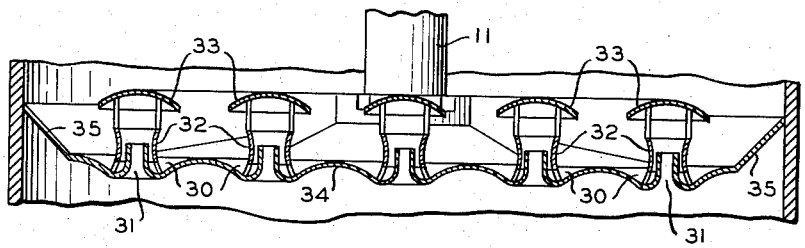
FIG. 5.
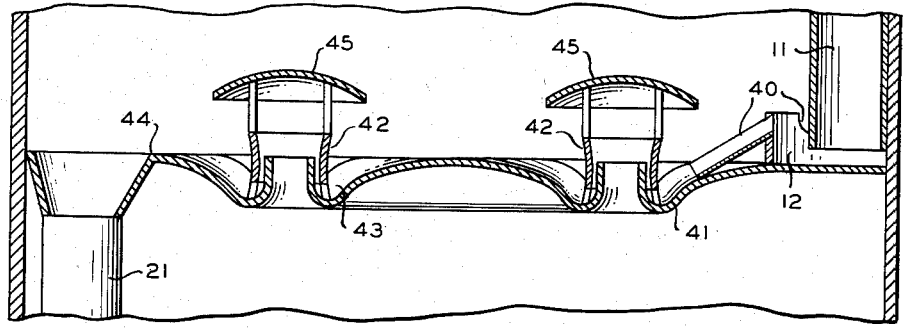
FIG. 7.
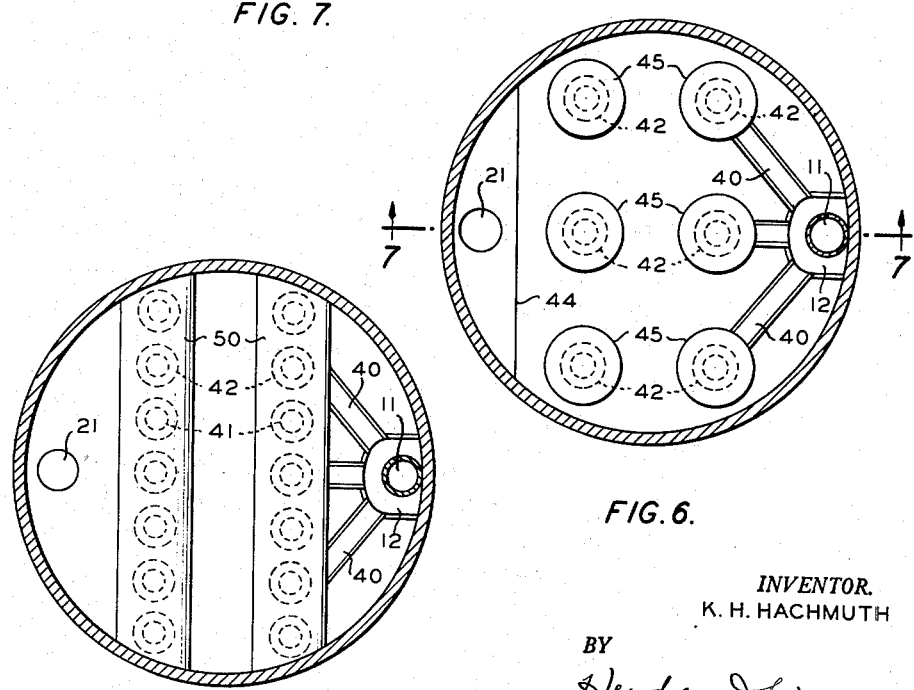
FIG. 6.
FIG. 8.
INVENTOR.
K. H. HACHMUTH
BY
ATTORNEYS United States Patent Office 2,965,548
Patented Dec. 20, 1960

2,965,548

FRACTIONATION METHOD AND APPARATUS FOR CONDUCTING SAME

Karl H. Hachmuth, Bartlesville, Okla., assignor to Phillips Petroleum Company, a corporation of Delaware Filed Aug. 11, 1955, Ser. No. 527,820

11 Claims. (Cl. 202—40)

This invention relates to fractionation, and more particularly relates to a fractionation method and apparatus wherein substantially all of the liquid present in the contacting zones is dispersed in the vapor to form a froth. In one of its aspects, the invention relates to a method and apparatus for fractionation in which vapor-liquid contact is accomplished by flowing the liquid across a plate which is provided with grooves or channels to conduct liquid to desired points or places on said plate, thus requiring a minimum of liquid to service points at which vapors rise through the plate thereby advantageously reducing to a minimum liquid hold-up (total liquid on the tray at any time), and causing froth or liquid-vapor dispersions thus formed to be guided across said plate between fins or dividers which are provided to prevent the froth in one channel from being blown into adjoining channels. In another of its aspects, the invention relates to a method and apparatus wherein at each point at which vapor passes through the plate it is caused to aspirate liquid by venturi action, the liquid being provided on said plate around said point in a depression, thus reducing to a minimum the amount of hold-up on the tray required to service provided venturi-type contacting means. In a further aspect of the invention, liquid to be fractionated is flowed in a plurality of streams across a fractionator tray in relative quantities which are related to the distance each of said streams' travels across said plate and proportional to the relative quantities of vapor each of said streams will contact while it travels across said tray.

In fractionation towers, especially in vacuum fractionators, it is desirable to accomplish uniform and thorough contacting of the liquid on the tray with vapors rising or passing therethrough, yet nevertheless, a minimum pressure drop and very little liquid hold-up. Furthermore, it is desirable to utilize to the fullest extent possible the energy of the vapor or gas passing through the caps or other points of liquid-vapor contact on the tray.

It is an object of this invention to provide an improved fractionator. Another object of this invention is to provide an improved method of fractionation. More specific objects of the invention are the provision of a method and tray apparatus for contacting a liquid and vapor or gas in a fractionator with uniform liquid distribution yet minimum liquid hold-up on the tray to accomplish a low pressure drop across said tray. Other aspects, objects, as well as the several advantages of the invention are apparent from a study of the disclosure, the drawings, and the appended claims.

According to the present invention, there are provided a method and apparatus for fractionation of a liquid which comprise flowing the liquid in separate streams substantially only to those points or places on a fractionating or contacting tray at which the vapors or gases to be contacted with said liquid pass through said tray and in relative quantities proportional to the quantity of vapor which each of said streams will contact on said tray, by conducting the said liquid to said points or places in channels or grooves which are the only places in which any substantial amount of undispersed liquid can be found on the tray. Also, in an embodiment fins or dividers are provided which prevent the froth which is found in one liquid channel from being blown into the adjoining channels.

Further, according to the present invention, there are provided a method and apparatus for contacting a liquid and a vapor or gas in a fractionation which comprise the steps and means, respectively, for collecting in a depression provided at or around each point or place, at which vapors or gases pass through a fractionator tray, a pool of liquid, said liquid pool, or pools, being the only undispersed liquid body, or bodies, of any substantial depth on said tray.

Still further according to the present invention, as a combination of the two inventions set out above, both channels or grooves for conducting the liquid to the points of fractionation and depressions or pools can exist on a tray.

Broadly, in one form of the invention, there is provided at a point on a tray in a fractionator a seal pot to which is fed liquid from a downcomer. The pot wall is provided with at least one slot, acting as a weir, usually several weirs are provided in the pot wall. In a preferred form of the invention, the wall is provided with a plurality of slots so proportioned relative to each other that each will feed its respective channel a stream containing a quantity of liquid proportional to the quantity of vapor said stream will contact in traveling across the fractionator tray. Liquid flowing through the weir is conducted by a trough, channel, or equivalent to around, or to surround, bubble caps or equivalent means such as vapor aspirator, liquid-vapor contact means, thus avoiding stagnant pools of liquid on the tray. In this manner, there is but a minimum of liquid hold-up on the tray. If desired, the tray can be generally slanted toward another point thereof which is provided with a downcomer which feeds a lower tray.

Still broadly, in another form of the invention, or as a modification of that just described, a depression or recess in the tray is provided at each cap, or equivalent, to surround the same with enough liquid to service the same. In the preferred embodiment of this form of the invention, aspirator liquid-vapor contact means or "bubble caps" are employed and the aspirator device dips into the liquid surrounding a riser pipe therein so that rising vapors will aspirate into the said means the liquid from said depression as will be further described below. As a further modification, of the several forms of the invention set forth herein, there are provided, as desired, channels or throughs which communicate liquid from a cap or contacting means to at least one other cap or contacting means, said channels or their equivalent being other than the trough, channel, or equivalent which conducts liquid from a weir or equivalent on a seal pot to a bubble cap or equivalent, as earlier described. That is, in addition to whatever means there may be feeding liquid to a pool surrounding a liquid vapor contacting means on a tray, there are provided crossover troughs or channels from one of said means to another. In a preferred form only the first few means on the side of the tray receiving the liquid are cross-connected and liquid overflowing pools thus connected is caused to find its way over high spots in the tray to and into the remaining pools on said tray.

It is a point of the essence of the invention that a tray is so designed and operated that there will be no liquid held up thereon except in said channels and/or depressions. In a specific form of plate, inactive areas are sloped, as desired, toward the channels, depressions and/or or the downcomer funnel which leads liquid from the tray to a lower tray. Thus, liquid in excess of the hold-up capacities of said channels and depressions immediately flows from said tray into a downcomer to be fed to a lower tray. There is no retaining weir or dam which could cause accumulation of liquid on the tray except at the places as described.

Since according to the invention flow of liquid is across a tray, deflector caps can be so designed and installed over the vapor-liquid contact means as to cause dispersed liquid-vapor mixture or froth or foam to move across the tray either in the direction of the flow of said liquid on the tray or counter thereto, or otherwise as desired, to control the thickness of mist or froth layer thereon.

Figure 2:
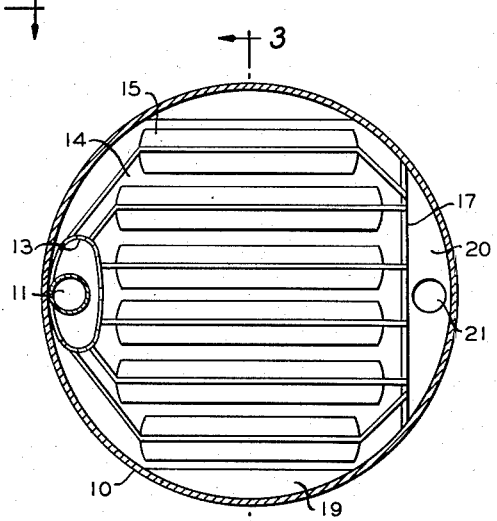
Figure 3:
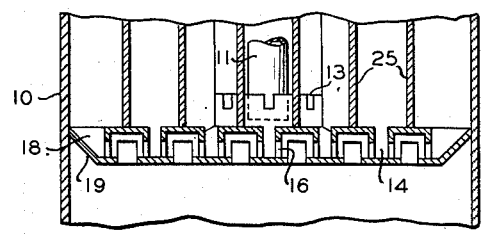
Figure 4:
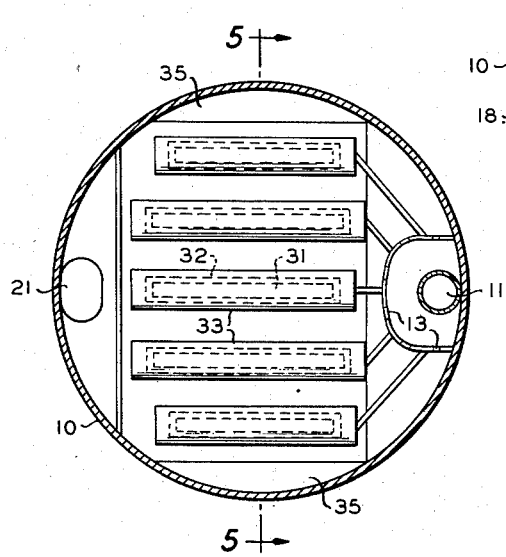

In the drawings, Figure 1 is a vertical cross-section of a section of a fractionator tower showing two trays and their associated downcomers. Figure 2 is a horizontal cross-section of Figure 1, along line 2—2 of Figure 1, generally showing the arrangement of the downcomers, seal pot, weirs, channels, fins, and, in this case, tunnel-type bubble cap means. At the right-hand side of the tray there is provided a retaining wall at a height to supply at the beginning of operation just sufficient hold-up in the channels to render the tray operative to obtain desired fractionation. If desired, the outlet weir may be slotted or notched. Overflow drops into the downcomer funnel there shown. Figure 3 is a vertical cross-section of the tray of Figure 2 taken along line 3—3 of Figure 2 showing in the background (of Figure 3) the weirs in the seal pot, the fins, the downcomer dipping into said pot, behind the seal pot wall and the channels through which liquid will flow toward the reader. Figure 4 is a plan view from on top of a tray and Figure 5 is a vertical cross-section of said tray taken along the line 5—5 of Figure 4. In Figures 4 and 5, the liquid flowing through the weirs in the wall of the seal pot (right-hand side of Figure 5) flows in the depressions alongside elongated aspirator-type liquid-vapor contacting elements which are equipped with correspondingly elongated deflector caps. Figure 6 is a plan view from top of a tray in which there are provided circular aspirator-type liquid-vapor contacting elements. In this modification, where for illustrative purposes only, six contactors are shown, the liquid from the seal pot is channeled only to the three contacting elements on the right-hand side of the drawing. Overflow from the depressions then flows across the tray to be captured in the depressions around the remaining contacting elements, and thence into the funnel of the left side downcomer. Figure 7 is a vertical cross-section of the tray of Figure 6 along line 7—7. Finally, Figure 8 is a modification of the device of Figure 6, in which elongated deflectors are arranged above rows of contacting elements which are essentially otherwise the same as those of Figures 6 and 7.

Referring now to Figures 1, 2 and 3 of the drawing, 10 indicates a fractionator tower shell. Liquid undergoing fractionation flows down from a tray not shown by way of downcomer 11 into pot 12. The wall of pot 12 is provided with serrations or weirs or slots 13. Viewing Figure 2, slots 13 are arranged to be of such width or are otherwise so proportioned as to meter desired proportions of liquid from the pot into the troughs or channels 14 which service elongated bubble caps 15. Caps 15 are preferably about 4 to 6 inches wide and spaced about 2 inches apart. However, the space between the caps can be varied over a wide range, depending on the specific structure of the tray and the vapor-liquid ratio of the material passing through the fractionator. If desired, caps having slots on only one side may be used as the short caps which are on the outside of the liquid path. Slots 16 are provided in the vertically disposed longer edges of the cap and are preferably about 1 inch high occupying about 50–65 percent of the available cap edge. Also, the slot area per unit length of cap preferably decreases from the inlet to the outlet ends of the cap. The slots are open to the tray surface. Inlet weirs are provided at the inlet ends of channels 14. Weir 17 at the outlet ends of channels 14 (see Figure 2, right-hand side) ensures that a specified level as well as quantity of liquid is maintained flowing through the service channels on the caps. Weir 17 is about the same height as vapor slots 16 which, in the preferred embodiment, is about 1 inch. It will be noted that the slots 13 are designed to provide a desired volume of liquid in each of the service channels. Thus, according to the invention, a larger quantity or volume of liquid per unit of time is metered to the long caps in the center of the column than is metered to the shorter caps at the side of the column. If the outside channel has vapor slots only on one side, then only half as much liquid will be introduced to this channel. It is preferred, now, to distribute to each channel a proportion of liquid which is related to the number of bubble slots disposed therein. As noted, inactive areas such as at 18 are blanked off by sloping walls such as wall 19, see Figure 3. Liquid which collects in funnel 20 is conducted by way of downcomer 21 to the tray below. With particular reference to Figures 1 and 3, it will be seen that the tops of the bubble caps are provided with fins 25 which are provided to prevent liquid or dispersed liquid from being blown out of one channel which at times may be a little more active into another channel. Also, these fins serve to guide foam or froth from one side of the tray to the other. These fins, preferably, extend from the downcomer seal pot wall to the tray outlet weir and may, if desired, extend to and be joined to the downcomer from the tray above. The fins should extend at least half way and preferably about three-fourths of the way up to the tray above. For example, in a column having trays spaced two feet apart, the fins should extend to within 3 or 4 inches of the tray above. It will be obvious to one skilled in the art in possession of this disclosure, studying the same, that streamlining of the various parts of equipment can be provided and will fall within the scope of the appended claims.

While Figures 1, 2 and 3 show that the channels are parallel to the general line of flow of the liquid from downcomer 11 to downcomer 21, it will be obvious to one skilled in the art in possession of this disclosure, studying the same, that it is within the scope of the appended claims to place the channels substantially across the said path of flow of liquid from downcomer 11 to downcomer 21 in which event the liquid may be traveling at an angle to the direction of travel of the dispersion or froth. Thus, as will be later evident from the description of Figure 8, it is possible to arrange the channels cross-wise of the general line of flow of the liquid across the plate and to allow the liquid at random to overflow from one channel into the other or to do so by passing through conduits or by way of other means which may be provided. Thus, by arranging the inactive surfaces of tray between channels thus positioned to rise to a point by sloping or otherwise shaping the same, there will be a minimum of hold-up on the inactive surfaces.

According to the arrangements of the figures of the drawing, slots velocities will be relatively high but the pressure drop and entrainment will be relatively low. However, in some systems, very high slot velocities will produce undesirable frothing and entrainment to such an extent that the efficiency of the tray will be lower than can be obtained with somewhat lower slot velocities. Thus, while it is desired to conduct the operation with substantially all liquid dispersed into the vapors in the column, care is taken to not exceed a desirable optimum dispersion. When a dispersion has been formed on the tray, during operation, the aspirator or other liquid-vapor contacting means, described herein will cause dispersion, as well as undispersed liquid to be contacted with the vapors. Nevertheless, calculations indicate that pressure drop will be as low as 2 to 3 mm. of mercury per tray under normal operating conditions. Thus, it will be noted that this type of tray has a very low liquid hold-up and eliminates pools of stagnant liquid on the tray. Essentially all of the liquid on the tray is present in the form of a dispersion. The advantage of such a feature is especially important and obvious when it is considered that many polymerizable materials, such as unsaturated hydrocarbons, are often required to be fractionated. The trays according to the figures of the drawing provide an efficient vapor-liquid contacting device having a low pressure drop which, of course, is especially important in vacuum fractionation. Although the invention is applicable to fractionation in general, and especially to the types of systems to which reference is made herein, it is especially desirable to note that the system is suitable for the high vacuum fractionation of mixtures of methylethyl pyridine and methylvinyl pyridine.

Fractionation tower design and calculations for any specific type of service can be accomplished by one skilled in the art in possession of this disclosure. Thus, it is not the intent of this disclosure to provide a design which is satisfactory for all uses. Indeed, it is the intent of this disclosure to set forth a basic concept and several embodiments of the same in each case of the two independent but related inventions which are set forth herein.

Referring now to Figures 4 and 5, it is noted that numerals which are the same as in Figures 1–3, already described, identify similar component elements. In Figures 4 and 5, the service channels are somewhat differently formed from channels 14 of Figures 1–3. Thus, in Figures 4 and 5, the service channels are formed by elongated depressions 30 which surround elongated riser 31. A depression 30 is in effect an elongated oval, when viewed from above Figure 5 and each riser 31 has mounted thereon an elongated aspirator-type vapor-liquid contact means 32 which is surmounted by deflector caps 33. If desired, fins may be placed on top of caps 33 similar to fins 25 shown in Figures 1 and 3. It will be noted that all inactive surfaces of the tray such as surfaces 34 and 35 are raised so that there will be a minimum of hold-up on the tray. In operation the tray in Figure 5 will have thereon just sufficient liquid to render the aspirator means 32 operative. When aspirator means 32 is operative, the liquid level in the depression 30 will be substantially at the bottom end of means 32. It should be noted that the caps on either side of the center cap are illustrated as being longer than the center cap. In connection with Figures 4 and 5, it will be noted that the elongated depressions are shown parallel to the general line of liquid flow from the downcomer 11 to downcomer 21. It is within the scope of the appended claims to place the said channels at an angle across the flow of the said liquid across the tray from downcomer 11 to downcomer 21.

In Figures 6 and 7, there is shown a modification of the present invention in which there are provided channels 40 leading liquid from seal pot 12 directly to depressions 41 surrounding substantially circular aspirator liquid-vapor contacting devices 42. Thus, in Figures 6 and 7, each aspirator device is supplied by its individual depression 41. It will be noted, further, that liquid overflowing depressions or pools 41 finds its way at random across the raised or inactive portions of the plate into pools 43. From pools 43, the liquid rises to a level slightly higher than point 44 of the plate and overflows into downcomer 21. It is within the scope of the appended claims to provide channels connecting one or more of pools 41 with each other and/or with pools 43. Further, deflector caps 45 which are provided upon contacting means 42, as already described, can be tilted to help to blow froth or foam across the plate in any desired direction. Although the drawing shows three rows containing 2 caps each, it is obvious that a large column tray would contain a number of rows and that each row might contain a different number of caps. In the preferred arrangement, the column would have bilateral symmetry, that is, corresponding rows of caps on each side of the center line which is parallel to the liquid flow would contain the same number of caps.

Finally, with respect to Figure 8, it will be noted that its embodiment is much like that shown in Figures 6 and 7 except that in lieu of individual deflector caps 45, there are shown tunnel-type deflectors 50. However, in Figure 8 as in Figures 6 and 7, each aspirator liquid-vapor contact means 42 is surrounded by its individual pool 41 of liquid undergoing fractionation.

Careful examination of the foregoing disclosure and drawings will make apparent the fact that the streams of liquid which flow across the contacting zone of a tray surface contact unequal volumes of vapor largely because the tray is ordinarily circular and the downcomer and seal pot are at the periphery of the circular plate. Therefore, the proportioning of each of the streams respecting the quantities of liquid flowing therein with respect to the quantities of vapor each of said streams will contact and, therefore, in relation to the distance each of said streams will flow across the surface of the plate is an important feature of the present invention, since it permits attainment of a fractionator design and operation not heretofore possible. It can also be seen that the careful proportioning of vapor and liquid to the various portions of the tray permits the introduction of only that amount of liquid to any part of tray which can be substantially dispersed into the vapor entering the same part of the tray. Furthermore, the feature of maintaining all of the portions of the tray's surface, which are not occupied by one of the vapor-liquid contacting means or zones, which according to the invention contain substantially all of the liquid on the tray, above the level of the liquid, where there is liquid on said tray, removes as hold-up from the tray all of the liquid which now ordinarily is found on a fractionator tray occupying the space between the vapor-liquid contacting means. No matter how small the ordinarily circular contacting means are made and no matter how many of them are supplied, there is always a so-called dead space between them which can be, according to this invention, maintained substantially free of liquid.

*Example*

A feed material of the following composition is fed at a rate of 3.9 g.p.m. to tray 70 of a fractionator containing 120 trays as described in connection with Figure 1; compositions in liquid volume percent, pyridine 0.2, 3-ethylpyridine 2.4, picolines (primarily 2-picoline) 12.7, 3-vinylpyridine 3.7, 2-5-lutidine 6.5, methylvinyl pyridine (MVP) 22.6, and methylethyl pyridine (MEP) 51.9. Superheated steam at a temperature of 495° F. is added to the bottom of the column at a rate of 17,448 lbs./hr. The top of the column is operated at an absolute pressure of 104 mm. of Hg and a temperature of about 120° F. A kettle product containing about 95 percent MVP is removed at a rate of 0.85 g.p.m. The remainder of the feed is removed as an overhead product along with most of the steam. The vapor stream is condensed and a water-rich phase and a pyridine-rich phase containing about 6 percent MVP is recovered as a product of the process. The MVP tends to polymerize to some extent when held as a liquid in the fractionator and the amount of polymerization depends on the residence time and the temperature. In this example, liquid hold-up is small and, therefore, residence time is short and polymerization is held to a minimum. In this example, pressure drop is also low which results in a kettle temperature below about 190° F. It is desirable to keep the kettle temperature below about 190° F. because polymerization proceeds quite rapidly above this temperature.

Reasonable variation and modification are possible within the scope of the foregoing disclosure, drawings and the appended claims to the invention, the essence of which is that there have been provided a method and apparatus for fractionating a liquid which comprise flowing a liquid substantially only to those points or places on a fractionating or contacting tray at which the vapors or gases to be contacted with said liquid pass through said tray by providing channels or grooves leading liquid from a downcomer seal pot to the said points or places and further, in one modification, providing at said points or places a depression in the tray to form a pool of liquid surrounding a provided liquor-vapor contacting means, streams of liquid being fed to said points or places on a fractionator tray being fed in quantities which are related to the distance the said streams will travel across said tray and proportional to the quantity of vapors each of said streams will contact during its travel across said tray, thus forming a dispersion of liquid in vapor passing through said tray, in a preferred embodiment maintaining the space between trays rather full of said dispersions while maintaining practically no liquid, as such, in a body, anywhere on said tray and guiding said dispersion across said tray between guiding elements or fins, all substantially as set forth and described in connection with the said drawings. Those skilled in the art in possession of this disclosure and its drawings will understand that they have been set forth for disclosure purposes only and that the underlying concepts can be embodied in form and manner different from those already shown. It is noted that the type of plate described herein may have a relatively low efficiency but that it is one which has a low pressure drop which it is one of the important objects of the invention to attain.

I claim:

1. A fractionator apparatus comprising a plurality of trays, each of said trays comprising a distribution chamber associated with said trays and means to supply liquid thereto, a plurality of liquid vapor contacting devices disposed on said trays, proportioning means in said chamber to divide said liquid into a plurality of streams in proportion to the vapor each stream contacts flowing across said tray, distribution means to direct said stream to said contacting devices, a collecting chamber associated with said tray to collect and recombine the liquid flowing across the tray and direct said liquid to the means to supply liquid associated with the next lower tray.

2. A fractionator apparatus comprising a plurality of trays, each of said trays comprising a distribution chamber associated with said trays and means to supply liquid thereto, a plurality of liquid vapor contacting devices disposed on said trays, proportioning means in said chamber to divide said liquid into a plurality of streams in proportion to the vapor each stream contacts flowing across said tray, distribution means to direct said stream to said contacting devices, a collecting chamber associated with said tray to collect and recombine the liquid flowing across the tray and direct said liquid to the means to supply liquid associated with the next lower tray, means to regulate the liquid level on said tray, substantially all of the portion of said tray outside the area occupied by said contacting devices being raised above the liquid level of normal operation, said tray being provided with the surfaces sloping from said portion outside said area toward said area.

3. A fractionator apparatus comprising a plurality of trays, each of said trays comprising a distribution chamber, means to supply liquid to said chamber, a plurality of elongated vapor liquid contacting devices arranged parallel on said tray, fluid conduits connecting said chamber with the area of each of said contacting devices, a slot in the wall of said chamber associated with each of said conduits, said slots being sized to proportion the flow of liquid to each of said contacting devices in proportion to the vapor contacted in each device, a collecting chamber associated with said tray adapted to collect and recombine the liquid flowing across said tray and direct said liquid to the means to supply liquid associated with the next lower tray.

4. A fractionator apparatus comprising a plurality of trays, each of said trays comprising a distribution chamber, means to supply liquid to said chamber, a plurality of elongated vapor liquid contacting devices arranged parallel on said tray, fluid conduits connecting said chamber with the area of each of said contacting devices, a slot in the wall of said chamber associated with each of said conduits, said slots being sized to proportion the flow of liquid to each of said contacting devices in proportion to the vapor contacted in each device, a collecting chamber associated with said tray adapted to collect and recombine the liquid flowing across said tray and direct said liquid to the means to supply liquid associated with the next lower tray, means to control the liquid level on said tray, the portion of said tray outside the area occupied by said contacting devices being above said liquid level, said tray being provided with surfaces sloping from said portion outside said area toward said area.

5. A fractionator apparatus comprising a plurality of trays, each of said trays comprising a distribution chamber and means to supply liquid thereto, a plurality of depressions in the surface of said tray, liquid vapor contacting devices disposed in said depressions, proportioning means in said chamber to divide said liquid into a plurality of streams in proportion to the vapor each stream contacts flowing across said tray, distribution means comprising fluid conduits to direct said streams to said contacting devices, a collecting chamber adapted to collect and recombine the liquid flowing across said tray and direct said liquid to the means to supply liquid associated with the next lower tray.

6. A fractionator apparatus comprising a plurality of trays, each of said trays comprising a distribution chamber and means to supply liquid thereto, a plurality of depressions in the surface of said tray, liquid vapor contacting devices disposed in said depressions, proportioning means in said chamber to divide said liquid into a plurality of streams in proportion to the vapor each stream contacts flowing across said tray, distribution means comprising fluid conduits to direct said streams to said contacting devices, a collecting chamber adapted to collect and recombine the liquid flowing across said tray and direct said liquid to the means to supply liquid associated with the next lower tray, said collecting chamber controlling the height of liquid on said tray, substantially all of the parts of said tray outside said depressions being above the liquid level of normal operation, said parts of said tray outside said depressions being connected with said depressions by sloping surfaces.

7. In the fractionation of a liquid wherein a liquid is caused to contact a vapor during flow of said liquid across a contacting surface, the steps which comprise flowing separate streams of liquid in essentially parallel flow from a first side of said surface in the same direction across said surface, said streams flowing unequal distances across said surface, directing each of said streams to at least one liquid vapor contacting locus on said surface, contacting each of said streams of liquid with vapor rising through said surface, proportioning each of said streams respecting the relative quantities of liquid flowing therein directly with respect to the quantity of vapor contacted by each of said streams, collecting and recombining the said streams at a second side of said surface, thus forming a recombined stream, and removing said recombined stream from said surface.

8. In the fractionation of a liquid wherein a liquid is caused to contact a vapor during flow of said liquid across a contacting surface, the steps which comprise flowing separate streams of liquid in essentially parallel flow from a first side of said surface in the same direction across said surface, said streams flowing unequal distances across said surface, directing each of said streams to at least one liquid vapor contacting locus on said surface, contacting each of said streams of liquid with vapor rising through said surface, proportioning each of said streams respecting the relative quantities of liquid flowing therein directly with respect to the quantity of vapor contacted by each of said streams, maintaining substantially all of said surface outside said liquid vapor contacting loci free of liquid, collecting and recombining said streams at a second side of said surface, thus forming a recombined stream, and removing said recombined stream from said surface.

9. In the fractionation of a liquid containing a desirable vinylpyridine to obtain said desirable vinylpyridine therefrom, the method of avoiding polymerization of said vinylpyridine during said fractionation which comprises causing said liquid to contact rising vapors during flow of said liquid across the surface of a fractionator tray, flowing separate streams of said liquid in essentially parallel flow from a first side of said surface in the same direction across said surface, said streams flowing unequal distances across said surface, directing each of said streams to at least one liquid vapor contacting locus on said surface, contacting each of said streams of liquid with vapor rising through said surface, proportioning each of said streams respecting the relative quantities of liquid flowing therein directly with respect to the quantity of vapor contacted by each of said streams, collecting and recombining said streams at a second side of said surface, thus forming a recombined stream from said surface.

10. In the fractionation of a liquid containing a desirable vinylpyridine to obtain said desirable vinylpyridine therefrom, the method of avoiding polymerization of said vinylpyridine during said fractionation which comprises causing said liquid to contact rising vapors during flow of said liquid across the surface of a fractionator tray, flowing separate streams of said liquid in essentially parallel flow from a first side of said surface in the same direction across said surface, said streams flowing unequal distances across said surface, directing each of said streams to at least one liquid vapor contacting locus on said surface, contacting each of said streams of liquid with vapor rising through said surface, proportioning each of said streams respecting the relative quantities of liquid flowing therein directly with respect to the quantity of vapor contacted by each of said streams, maintaining substantially all of said surface outside said liquid vapor contacting loci free of liquid, collecting and recombining said streams at a second side of said surface, thus forming a recombined stream and removing said recombined stream from said surface.

11. A fractionator apparatus comprising a plurality of trays, each of said trays comprising a distribution chamber, means to supply liquid to said chamber, a plurality of elongated vapor liquid contacting devices arranged parallel on said tray, a plurality of partition means associated with said contacting devices extending a substantial distance across each tray and a substantial distance upwardly between successive trays adapted to maintain the flow in separate streams, fluid conduits connecting said chamber with the area of each of said contacting devices, a slot in the wall of said chamber associated with each of said conduits, said slots being sized to proportion the flow of liquid to each of said contacting devices in proportion to the vapor contacted in each device, a collecting chamber associated with said tray adapted to collect and recombine the liquid flowing across said tray and direct said liquid to the means to supply liquid associated with the next lower tray.

References Cited in the file of this patent

UNITED STATES PATENTS

| | | |
|---|---|---|
| 784,556 | Gerdes | Mar. 14, 1905 |
| 1,664,483 | Piron | Apr. 3, 1928 |
| 1,738,870 | Cox et al. | Dec. 10, 1929 |
| 1,882,104 | Wallis | Oct. 11, 1932 |
| 1,982,226 | Monro | Nov. 27, 1934 |
| 2,142,598 | Allen | Jan. 3, 1939 |
| 2,222,565 | Kraft | Nov. 19, 1940 |
| 2,309,309 | Glitsch | Jan. 26, 1943 |
| 2,339,561 | Durrum | Jan. 18, 1944 |
| 2,374,950 | Packie et al. | May 1, 1945 |
| 2,591,343 | Eld | Apr. 1, 1952 |
| 2,720,389 | Twomey et al. | Oct. 11, 1955 |
| 2,737,377 | Huggins et al. | Mar. 6, 1956 |
| 2,753,166 | Bergman | July 3, 1956 |
| 2,757,915 | Huggins | Aug. 7, 1956 |
| 2,767,967 | Hutchinson | Oct. 23, 1956 |
| 2,787,453 | Hibshman et al. | Apr. 2, 1957 |
| 2,868,696 | Skinner | Jan. 13, 1959 |

FOREIGN PATENTS

| | | |
|---|---|---|
| 884,837 | France | May 8, 1943 |